( 12 ) United States Patent
Faller et al.

(10) Patent No.: US 9,165,564 B2
(45) Date of Patent: Oct. 20, 2015

(54) METHOD AND APPARATUS FOR FRAME-BASED BUFFER CONTROL IN A COMMUNICATION SYSTEM

(71) Applicant: Agere Systems LLC, Allentown, PA (US)

(72) Inventors: Christof Faller, Murray Hill, NJ (US); Raziel Haimi-Cohen, Springfield, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/198,738

(22) Filed: Mar. 6, 2014

(65) Prior Publication Data

US 2014/0188489 A1    Jul. 3, 2014

Related U.S. Application Data

(60) Continuation of application No. 12/262,239, filed on Oct. 31, 2008, now Pat. No. 8,724,763, which is a division of application No. 09/895,926, filed on Jun. 29, 2001, now Pat. No. 7,460,629.

(51) Int. Cl.
| | |
|---|---|
| *H04L 7/00* | (2006.01) |
| *G10L 19/16* | (2013.01) |
| *H04H 60/27* | (2008.01) |
| *H04J 3/06* | (2006.01) |
| *H04J 3/16* | (2006.01) |
| *H04N 19/152* | (2014.01) |

(52) U.S. Cl.
CPC .............. *G10L 19/167* (2013.01); *H04H 60/27* (2013.01); *H04J 3/0632* (2013.01); *H04J 3/1688* (2013.01); *H04H 2201/20* (2013.01); *H04N 19/152* (2014.11)

(58) Field of Classification Search
CPC .... H04N 19/152; H04N 19/61; G10L 19/167; H04H 2201/20; H04H 60/27; H04L 47/12; G06T 1/60
USPC .......... 375/295, 316, 354, 371, 372, 373, 377
See application file for complete search history.

(56) References Cited

U.S. PATENT DOCUMENTS

| | | | |
|---|---|---|---|
| 5,159,447 A | 10/1992 | Haskell et al. | ........... 375/240.05 |
| 5,164,828 A | 11/1992 | Tahara et al. | ............ 375/240.13 |

(Continued)

*Primary Examiner* — Tesfaldet Bocure
(74) *Attorney, Agent, or Firm* — Daniel J. Santos; Smith Risley Tempel Santos LLC

(57) ABSTRACT

A digital audio broadcasting (DAB) communication system with a decoder buffer specified by a maximum number of encoded frames is disclosed. A predicted number of encoded frames, $F_{pred}$, in the decoder is sent to a receiver with audio data. If the decoder buffer level becomes too high, additional bits are allocated to each frame for each of N programs. If the decoder buffer level becomes too low, fewer bits are allocated to each frame for each of the N programs. $F_{pred}$ can also be employed to (i) enable the decoder; and (ii) synchronize the transmitter and the receiver. The receiver fills the decoder buffer with $F_{pred}$ frames before commencing decoding frames. The transmitter and receiver clocks may be synchronized with a feedback loop that compares the actual level of the decoder buffer to the predicted value, $F_{pred}$, received from the transmitter.

18 Claims, 3 Drawing Sheets

(56) References Cited

U.S. PATENT DOCUMENTS

| | | | |
|---|---|---|---|
| 5,241,383 A * | 8/1993 | Chen et al. | 375/240.04 |
| 5,365,552 A | 11/1994 | Astle | 375/354 |
| 5,390,299 A | 2/1995 | Rege et al. | 709/234 |
| 5,566,206 A | 10/1996 | Balakrishnan | 375/240 |
| 5,566,208 A | 10/1996 | Balakrishnan | |
| 5,592,584 A | 1/1997 | Ferreira et al. | 704/203 |
| 5,619,341 A | 4/1997 | Auyeung et al. | 358/404 |
| 5,717,464 A * | 2/1998 | Perkins et al. | 375/240.05 |
| 5,844,867 A | 12/1998 | De Haan et al. | 369/47.35 |
| 5,859,660 A | 1/1999 | Perkins et al. | 725/32 |
| 5,901,149 A | 5/1999 | Itakura et al. | 370/468 |
| 5,918,073 A | 6/1999 | Hewitt | 713/503 |
| 5,920,732 A | 7/1999 | Riddle | 710/56 |
| 5,958,027 A | 9/1999 | Gulick | 710/300 |
| 6,151,359 A | 11/2000 | Acer et al. | 375/240.28 |
| 6,233,226 B1 | 5/2001 | Gringeri et al. | 370/252 |
| 6,247,072 B1 | 6/2001 | Firestone | 710/53 |
| 6,347,380 B1 | 2/2002 | Chang et al. | 713/503 |
| 6,452,943 B1 | 9/2002 | Furuya | 370/468 |
| 6,463,410 B1 | 10/2002 | Fuchigami et al. | 704/219 |
| 6,487,535 B1 | 11/2002 | Smyth et al. | 704/500 |
| 6,560,199 B1 | 5/2003 | Hoshino | 370/236 |
| 6,674,797 B1 | 1/2004 | Golin | 375/240.01 |
| 6,683,889 B1 | 1/2004 | Shaffer et al. | 370/516 |
| 6,701,372 B2 | 3/2004 | Yano et al. | 709/232 |
| 6,741,648 B2 | 5/2004 | Karczewicz et al. | 375/240.02 |
| 6,757,659 B1 | 6/2004 | Tanaka et al. | 704/501 |
| 6,819,727 B1 | 11/2004 | Cucchi et al. | 375/372 |
| 7,187,697 B1 | 3/2007 | Aviely et al. | 370/517 |
| 2007/0025441 A1 * | 2/2007 | Ugur et al. | 375/240.03 |

\* cited by examiner

METHOD AND APPARATUS FOR FRAME-BASED BUFFER CONTROL IN A COMMUNICATION SYSTEM

CROSS-REFERENCE TO RELATED APPLICATIONS

This application is a continuation of U.S. patent application Ser. No. 12/262,239, filed Oct. 31, 2008, now U.S. Pat. No. 8,724,763 issued on May 13, 2014 which is a divisional of U.S. patent application Ser. No. 09/895,926, filed Jun. 29, 2001, now U.S. Pat. No. 7,460,629 issued on Dec. 2, 2008, each incorporated by reference herein.

FIELD OF THE INVENTION

The present invention relates generally to digital audio broadcasting (DAB) and other types of digital communication systems, and more particularly, to buffer control techniques for such digital audio broadcasting (DAB) and other types of digital communication systems.

BACKGROUND OF THE INVENTION

Proposed systems for providing digital audio broadcasting (DAB) are expected to provide near compact disk (CD)-quality audio, data services and more robust coverage than existing analog FM transmissions. Digital audio broadcasting systems compress an audio signal using a digital audio encoder, such as a perceptual audio coder (PAC). Perceptual audio coders reduce the amount of information needed to represent an audio signal by exploiting human perception and minimizing the perceived distortion for a given bit rate. Perceptual audio coders are described, for example, in D. Sinha et al., "The Perceptual Audio Coder," Digital Audio, Section 42, 42-1 to 42-18, (CRC Press, 1998), incorporated by reference herein. Generally, the amount of information needed to represent an audio signal is reduced using two well-known techniques, namely, irrelevancy reduction and redundancy removal. Irrelevancy reduction techniques attempt to remove those portions of the audio signal that would be, when decoded, perceptually irrelevant to a listener. This general concept is described, for example, in U.S. Pat. No. 5,341,457, entitled "Perceptual Coding of Audio Signals," by J. L. Hall and J. D. Johnston, issued on Aug. 23, 1994, incorporated by reference herein.

Digital radio will be offered in a single channel and multiple channel form. The single channel form will use the existing infrastructure of FM broadcasting. Each digital audio channel is broadcast in the bandwidth allocated to one FM channel. Until such time as a transition to an all-digital DAB system can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

FIG. 1 illustrates a conventional DAB communication system 100. As shown in FIG. 1, the DAB communication system 100 employs a radio transmission link 130 that is typically of a fixed bit rate. The bit rate of the audio encoder 110, on the other hand, is typically variable, depending on the complexity of the current audio signal and the audio quality requirements. On average, the bit rate of the audio encoder 110 is equal to or less than the capacity of the transmission link 130, but at any given instance the bit rate of the audio coder 110 may be higher. If data from the audio encoder 110 was applied directly to the transmission link 130, data would be lost each time the instantaneous bit rate of the encoder 110 exceeded the capacity of the transmission link 130. In order to prevent such a loss of data, the output of the encoder 110 is buffered into a first-in-first-out (FIFO) buffer 120 before being applied to the transmission link 130. If the instantaneous bit rate of the encoder 110 is higher than the bit rate of the transmission link, the amount of data in the FIFO buffer 120 increases. Similarly, if the instantaneous bit rate of the encoder 110 is lower than the bit rate of the transmission link 130, the amount of data in the FIFO buffer 120 decreases. The encoder 110 typically contains a control loop that modifies the bit rate of the encoder 110 and prevents the encoder 110 from overflowing or underflowing the FIFO buffer 120. Overflow causes a loss of bits, while an underflow wastes some of the capacity the transmission link 130.

As a result of this scheme, the transmission delay is also variable. The delay between the time when an audio packet is first written into the FIFO buffer 120 and the time when the packet is actually received by the receiver 150 depends, among other factors, on the amount of data that is currently stored in the FIFO buffer 120. However, the audio decoder 170 at the receiver 150 needs to get audio packets at a fixed rate (of packets per second) in order to play continuously. Therefore, it is necessary to buffer the audio data at the decoder 170 by using a buffer 160. When the receiver 150 is first powered up or is tuned to a new channel, the decoder 170 begins to play only after a certain initialization period, during which time packets are received and stored in the decoder-input buffer 160. After the decoder 170 begins playing, the decoder 170 consumes packets from the input buffer 160 at a fixed rate, while at the same time new packets arrive and are stored in the same buffer 160. The decoder input-buffer 160 has to have enough capacity so that even in the worst case of minimal delay and largest packet size, the buffer 160 will not overflow. In addition, the initialization period has to be sufficiently long to accumulate enough packets in the buffer 160 so that the buffer does not become empty due to transmission delays.

FIG. 2 illustrates a conventional multiple channel DAB communication system 200 that multiplexes N audio programs into one bitstream. A commercial example of such a multiple channel DAB communication system 200 is the Sirius Satellite Radio network. In such a multiple channel DAB communication system 200, N audio channels (e.g., N can be on the order of 100) are sampled and each sampled signal is applied to a corresponding audio encoder 210-1 through 210-N (hereinafter, collectively referred to as audio encoders 210). The bit streams generated by each audio encoder 210 are multiplexed at a joint bitstream stage 220 and buffered by a FIFO buffer 230 to form a composite bit stream of a very high bit rate. This composite bit stream is modulated and transmitted as a wide band radio signal. At the receiver 250, the composite bit stream is recovered from the incoming signal and demultiplexed by a bitstream parser 260. All channels are discarded except for the channel that is currently selected for listening. The bit stream of the selected channel is buffered by a FIFO buffer 270, decoded by an audio decoder 280 and converted to an analog audio signal.

Typically, the level of the buffers in a DAB communication system, such as the DAB communication systems 100, 200 illustrated in FIGS. 1 and 2, respectively, is specified and monitored in terms of a maximum number of bits. Normally, the centralized transmitter can have a high cost and thus the encoder buffer 120, 230 can be virtually any size. For the receivers, however, the buffer-size is a cost critical factor. In a multiple channel DAB system, such as the communication system 200 shown in FIG. 2, the decoder 280 decodes different radio programs based on the selected channel. Thus, the buffer-level measured in terms of the number of bits is different for each program that is decoded, since each of the N multiplexed encoded audio programs can have a different momentary bit rate.

Another issue in the design of DAB communication systems is the synchronization between the encoder 110 and the decoder 160. After the decoder 170 at the receiver 150 decodes a packet, the receiver 150 converts the resulting audio samples into an analog signal by applying the samples to a digital to analog converter (D/A) at a rate that should be identical to the sampling rate at the encoder 110. If the sampling rates at the encoder 110 and decoder 170 are even slightly different (a few parts per million), the packet buffer 160 at the decoder 170 will eventually overflow or underflow.

A need therefore exists for an improved buffer control technique that utilizes a buffer-level limit that may be applied regardless of the program selected by the receiver. In addition, a need exists for an improved buffer control technique that helps to synchronize the encoder and the decoder in a DAB communication system.

SUMMARY OF THE INVENTION

Generally, a method and apparatus are disclosed for controlling a buffer in a digital audio broadcasting (DAB) communication system. According to one aspect of the invention, the same number of encoded frames are transmitted for each of the N audio programs in a multiplexed bit stream and the decoder buffer level limits are specified in terms of a maximum number of encoded frames (or duration). Thus, a buffer limit specified in terms of the number of encoded frames in the decoder buffer will be the same regardless of the selected program.

Thus, the present invention controls the level of the decoder buffer for each of the N audio programs at once, by ensuring that the level of the decoder buffer stays within a given range of frames. The transmitter can compute a predicted number of encoded frames in the decoder buffer, $F_{pred}$, and transmit this value, $F_{pred}$, to the receiver with the audio data. Generally, the transmitter can compute the number of encoded frames in the decoder buffer using the respective data rates of the transmitter and receiver and the channel bit rate. In addition, if the transmitter determines that the decoder buffer level is becoming too high, which means that the encoded frames generated by the encoder are too small on average, then additional bits are allocated to each frame in some or all of the N programs. Likewise, if the transmitter determines that the decoder buffer level is becoming too low, which means that the encoded frames generated by the encoder are too big on average, then fewer bits are allocated to each frame in some or all of the N programs.

According to another aspect of the invention, the transmitted predicted buffer level, $F_{pred}$, can be employed to (i) determine when the receiver should commence decoding frames; and (ii) synchronize the transmitter and the receiver. The receiver receives the predicted value, $F_{pred}$, from the transmitter and compares the actual buffer level with the predicted level, $F_{pred}$. The receiver fills the decoder buffer until $F_{pred}$ frames are received before commencing decoding of frames, when the decoder first starts up or possibly when a new audio program is selected, in order to be synchronized with the computation of the predicted decoder buffer level, $F_{pred}$. In addition, the receiver uses the received predicted value, $F_{pred}$, to adjust the local receiver clock such that the clock is synchronized with the transmitter. In this manner, the transmitter and receiver may be synchronized by adjusting the clock at the receiver by using a feedback loop that compares the actual level of the decoder buffer to the predicted value, $F_{pred}$, received from the transmitter. A higher number of encoded frames in the decoder buffer indicates that the clock of the receiver is too slow and should be increased, and conversely, a lower number of encoded frames in the buffer indicates that the clock of the receiver is too fast and needs to be slowed down.

A more complete understanding of the present invention, as well as further features and advantages of the present invention, will be obtained by reference to the following detailed description and drawings.

DETAILED DESCRIPTION

Figure 1:
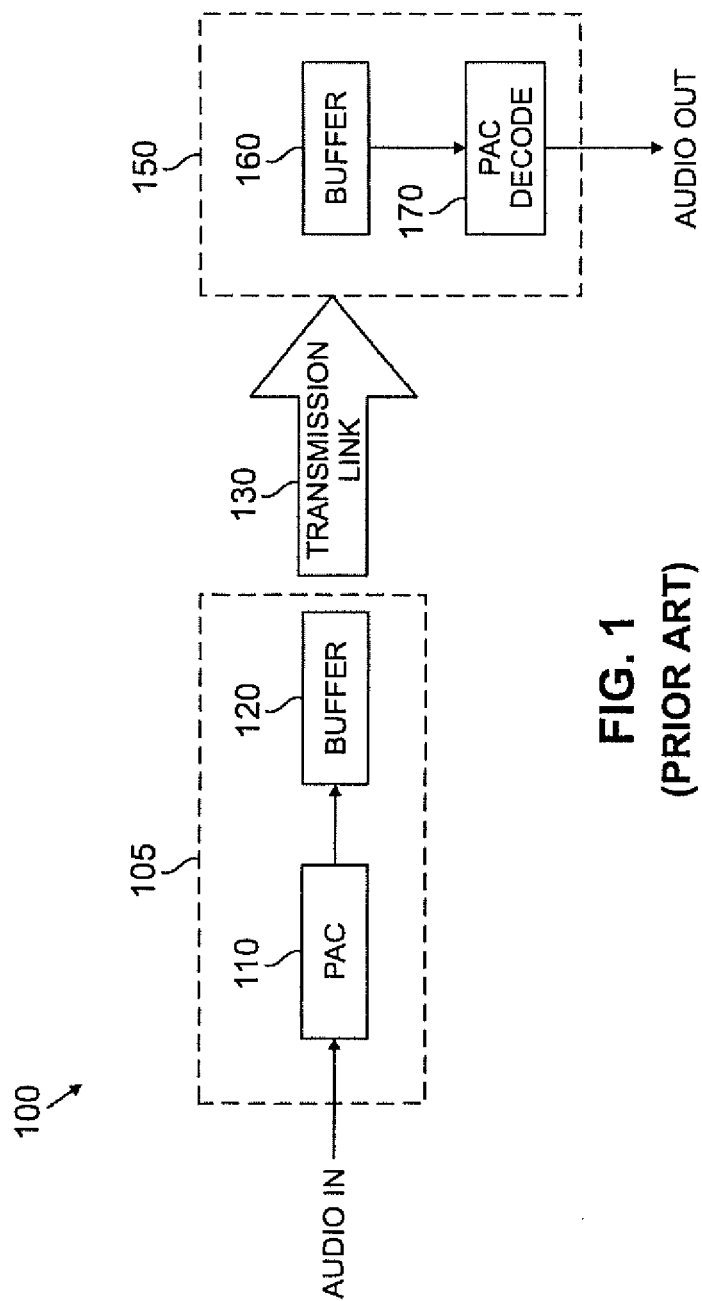
FIG. 1 illustrates a conventional DAB communication system.
Figure 2:
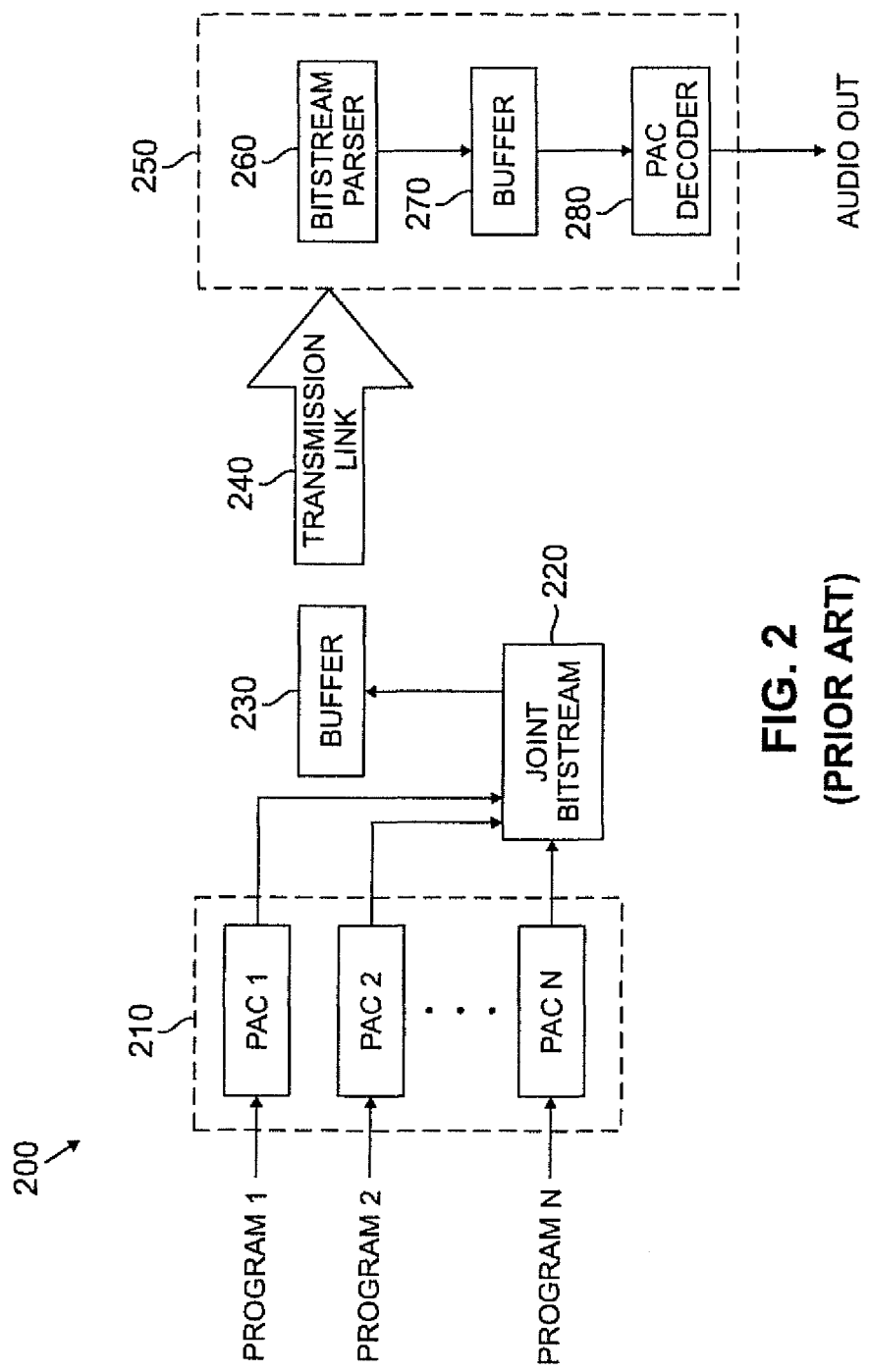
FIG. 2 illustrates a conventional multiple channel DAB communication system that multiplexes N audio programs into a single bitstream.
Figure 3:
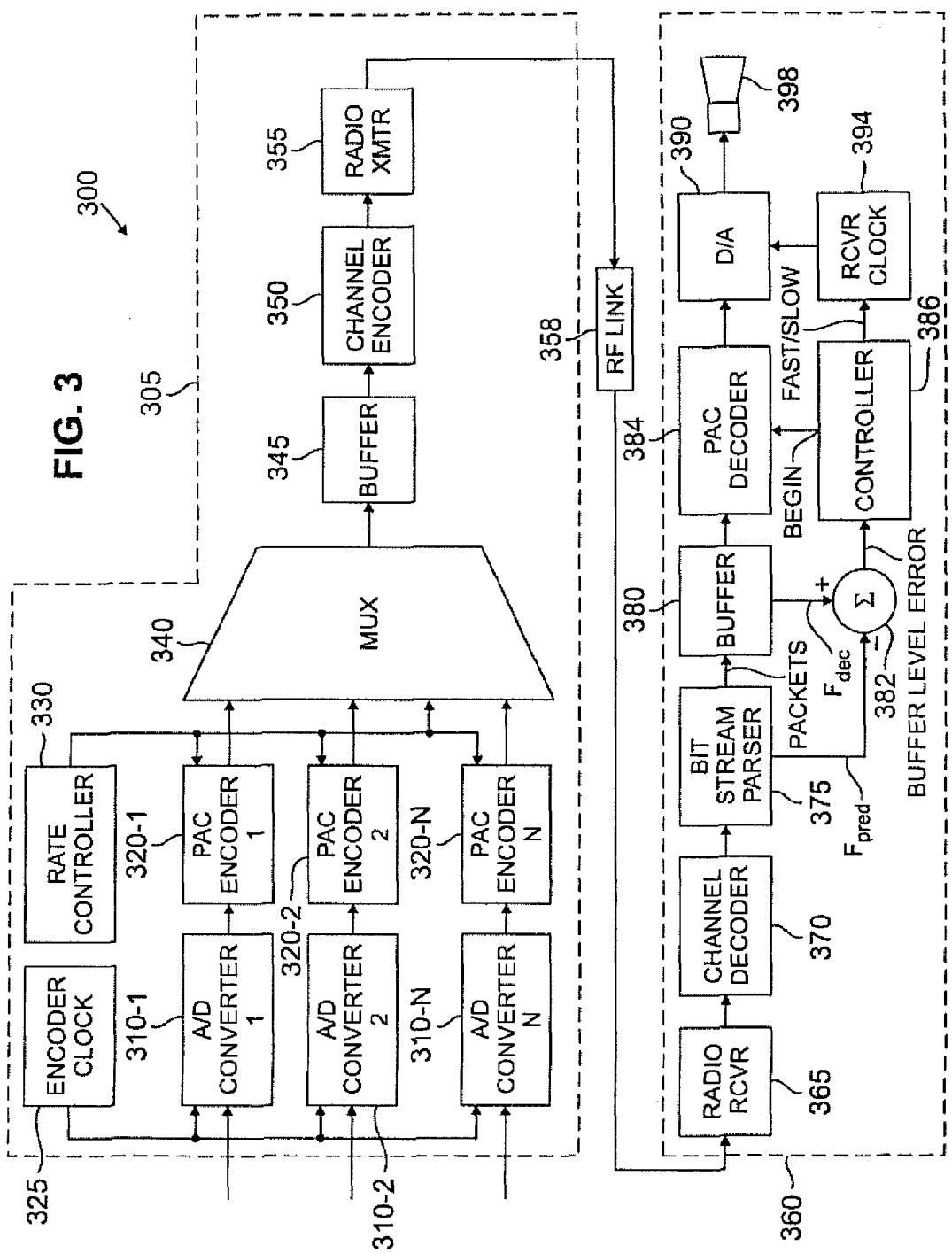
FIG. 3 illustrates a multiple channel DAB communication system in accordance with the present invention.

FIG. 3 illustrates a multiple channel DAB communication system 300 in accordance with the present invention. According to one aspect of the present invention, the buffer level limit is specified in terms of a maximum number of encoded frames, or duration. As discussed further below, the present invention ensures that the number of encoded frames that are transmitted (as opposed to the number of bits that are transmitted) is the same for each of the N audio programs in a multiple channel communication system. It is noted that an encoded frame for one program may arrive before an encoded frame of another program in the interleaved stream. Thus, the instantaneous number of frames transmitted can differ by up to a few frames, which can be regarded as jitter. In any event, the number of encoded frames in the decoder buffer provides a good measure for the buffer-level, because the number of encoded frames in the decoder buffer will be the same for all decoders playing back any of the N audio programs. As used herein, all references to the term "buffer level" indicate the number of encoded frames in the buffer. It should be clear that two buffers with the same buffer level may nonetheless contain a different number of bits, depending on the instantaneous bit rate. Nevertheless, for typical audio coding algorithms it is possible to set, for any buffer level, a corresponding upper bound on the number of bits in the buffer.

DAB Transmitter

As shown in FIG. 3, the DAB communication system 300 includes a transmitter 305 and a receiver 360. The communication system 300 converts N audio channels to digital signals using D/A converters 310-1 through 310-N (hereinafter, collectively referred to as D/A converters 310). The digital signals are then applied to a corresponding PAC encoder 320-1 through 320-N (hereinafter, collectively referred to as PAC encoders 320). The bit streams generated by each PAC encoder 320 are multiplexed by a multiplexer 340 and buffered by a FIFO buffer 345 to form a composite bit stream. A channel encoder 350 performs a number of operations on the composite bit stream, such as error correction coding and interleaving. The channel encoder 350 is an additional source of variable delay at the PAC decoder. A radio transmitter 355 modulates and transmits the composite bit stream as a wide band radio signal via an RF link 358. A rate controller 330 modifies the bit rate of the PAC encoders 320 to prevent the PAC encoders 320 from overflowing or underflowing the decoder buffer 380, in a manner discussed further below.

According to one feature of the invention, the multiplexer 340 maintains an equal frame rate for all N programs. Generally, the multiplexer 340 has an output frame rate, i.e., the number of encoded frames written into the buffer 345 in a time unit, that is approximately equal for all N programs. In one exemplary implementation, the frame rate is kept equal for all N channels by using a round robin scheme. The multiplexer 340 keeps feeding bits from a particular PAC encoder 320-$i$ to the buffer 345 until it reaches the end of a packet.

The PAC encoders 320 segment the input audio signal in a known manner and each segment is referred to as a frame. The term frame indicates both the duration of the segment and the audio samples it contains. In a typical perceptual audio coder (PAC) implementation, for example, 1024 samples are processed as a frame. The processing of each frame may yield a variable number of bits. A packet is an encoded frame, i.e., the output of a single encoder for a single frame. Each of the N programs are encoded into packets at the same pace, and the encoded frames of the N programs are interleaved for transmission to the receiver 360. Once the end of a packet is reached, the multiplexer 340 moves to the next PAC encoder 320-$i$ and begins feeding bits into the buffer 345 until it reaches the end of a packet, and so on. When an end of a packet is reached for PAC encoder 320-N, the multiplexer 340 again begins feeding bits from the first PAC encoder 320-1.

Assuming that the encoder clock 325 and decoder clock 394 run at the same clock speed and the rate controller 330 knows the transmission channel bit rate, the encoder can compute the decoder buffer level for each time instance. For a single channel system, the number of bits and the number of frames in the encoder and decoder buffers 345 and 380, respectively, have anti-symmetrical behavior in the sense that their sum is approximately constant. For a multiple channel system having a joint bit stream, however, only the number of joint frames in the encoder buffer, $F_{enc}$, has anti-symmetrical behavior to the number of frames in the decoder buffer, $F_{dec}$ (regardless of which of the N channel is selected). Thus, the rate controller 330 can compute a predicted number of encoded frames in the decoder buffer 380 (discussed below) using the following relation:

$$F_{pred} = F_{dec_0} - (F_{enc} - F_{enc_0}) \quad (1)$$

where $F_{enc_0}$ is the initial and desired encoder buffer level and $F_{dec_0}$ is the initial and desired decoder buffer level. Note, however, that $F_{pred}$ is only an approximation to the actual decoder buffer level, $F_{dec}$, since in practice, the receiver and transmitter may not be perfectly synchronized, the actual decoder buffer level, $F_{dec}$, may not be exactly the value computed according to equation (1).

To control the level of the decoder buffer 380 for each of the N audio programs at once, the rate controller 330 must only make sure that the predicted level of the decoder buffer 380 stays within a given range of frames (e.g., between $F_{min}$ and $F_{max}$). The lower limit, $F_{min}$, is chosen to be at least one and generally large enough to prevent an underflow caused by fluctuations of the arriving bits due to variable delays at the channel encoding and at the bit stream parser 375 (discussed below). It is noted that the latter are receiver specific, hence $F_{min}$ may vary from receiver to receiver. A decoder buffer 380 is selected with a capacity of at least $F_{max}$ frames plus the variable delays due to channel-encoding and bit stream parsing. Therefore, the minimum required capacity of the decoder buffer is also model specific. However, the difference $F_{max} - F_{min}$ is identical for all receivers. Thus, the rate controller 330 keeps track of the predicted number of encoded frames, $F_{pred}$, in the decoder buffer 380 and transmits the value $F_{pred}$ to the receivers 360 with the audio data.

The initial and desired decoder buffer level, $F_{dec_0}$, should be selected to provide enough buffering to compensate for the variable delay effect caused by the PAC encoder, the variable delay effect caused by the channel coder and decoder (e.g., interleaving and block error correction coding) and the variable delay effects caused by the receiver itself (e.g., in the bit stream parser). There may be several commercially available models of receivers and each of them may have different variable delay effects caused by the receiver itself. Thus, the initial and desired decoder buffer level, $F_{dec_0}$ is receiver specific and cannot be used in the rate controller 330. Therefore, in another embodiment of the invention, the rate controller 330 assumes one reference receiver, and the value transmitted by the rate controller 330 is $(F_{enc} - F_{enc_0})$ which depends only on encoder specific values. Each receiver subtracts this value from its own specific $F_{dec_0}$ value in order to obtain its own specific $F_{pred}$ value. In the following, any reference to transmitting the value $F_{pred}$ should be construed as also implying transmitting of $(F_{enc} - F_{enc_0})$ by the transmission system and computation of $F_{pred} = F_{dec_0} - (F_{enc} - F_{enc_0})$ by the receiver.

If the rate controller 330 determines that the decoder buffer level is becoming too high, the frames being generated by the PAC encoders 320 are too small. Thus, the PAC encoders 320 are tuned by rate controller 330 to allocate additional bits to each frame for each of the N programs. Likewise, if the rate controller 330 determines that the decoder buffer level is becoming too low, the frames being generated by the PAC encoders 320 are too big. Thus, the PAC encoders 320 are tuned by rate controller 330 to allocate fewer bits to each frame for each of the N programs. For example, in a PAC implementation, the PAC encoders 320 can control the bit rate by adding additional quantization noise to the encoded audio signal. For a more detailed discussion of how additional quantization noise is added to the encoded audio signal in a PAC implementation, see the PAC references incorporated by reference above. A possible implementation may add an offset, Q, to the masked threshold, resulting in a choice of quantizers with coarser step size for larger Qs. In one implementation, the buffer control may be implemented in accordance with the following expression:

$$Q = -(F\text{dec} - F\text{dec}_0) * w \quad (2)$$

where the weight, w, indicates the strength of the buffer feedback control and is a value greater than zero (>0).

In general, the control of the bit rate is done by tuning some parameters of the PAC encoders 320 that determine the quality of the encoding, where better quality results in a higher bit rate and vice versa, but there are two notable exceptions: First, if the audio input to some of the encoders 320-$i$ is very simple (e.g. silence), the bit rate of those encoders 320-$i$ may remain low even if the PAC encoder 320-$i$ is tuned to maximum quality. This may result in having more than $F_{max}$ packets in the decoder buffer 380. In the multiple channel case, if a receiver 360 is tuned to a program in which the bit rate is high, more than $F_{max}$ packets in the receiver buffer 380 may cause an overflow. In order to prevent such an overflow, the rate controller 330 feeds, in this case, "waste bits" into the multiplexer 340. These "waste bits" are designated as belonging to a non-existent program (say N+1). The multiplexer 340 feeds those bits into the buffer 345, thus throttling the frame rate to the desired level. Second, under certain conditions, decreasing the quality of the encoding does not lead to a sufficiently low bit rate, or the quality needed to get the required low bit rate is too poor to be useable. In this case, the PAC encoder 320 outputs, instead of the actual packet, a special short packet that contains only a code indicating a packet erasure. Such a special packet is referred to as an "empty packet." The PAC decoder 384 treats an empty packet in the same way that it treats a packet that has been corrupted during the radio transmission—it generates the audio for this packet by interpolation from the preceding and following good packets.

DAB Receivers

As previously indicated, the DAB communication system 300 includes one or more receivers 360. According to another aspect of the present invention, the transmitted predicted buffer level, $F_{pred}$, can be employed by the receivers 360 to (i) determine when the receivers 360 should commence decoding frames; and (ii) synchronize the transmitter 305 and the receiver 360. More specifically, the receiver 360 receives the predicted value, $F_{pred}$, from the transmitter 305 with the audio data and compares the actual buffer level with the predicted level, $F_{pred}$. When the receiver 360 first starts up or possibly when a new audio program is selected, the receiver 360 fills the decoder buffer 380 until approximately $F_{pred}$ frames are received before commencing decoding frames in order to be synchronized with the computation of the predicted decoder buffer level, $F_{pred}$, as determined by the transmitter 305.

In addition, the receiver 360 uses the received predicted value, $F_{pred}$, to adjust the local clock 394 such that the receiver clock 394 is synchronized with the transmitter 305. In this manner, the transmitter 305 can correct a time drift that might occur due, for example, to clock jitter. Thus, the transmitter 305 and receiver 360 may be synchronized by adjusting the receiver clock 394 at the D/A 390 by using a feedback loop that compares the actual level of the decoder buffer 380 to the predicted value, $F_{pred}$, received from the transmitter 305. A higher number of encoded frames in the buffer 380 indicates that the receiver clock 394 of the D/A 390 is too slow and should be increased, and conversely, a lower number of encoded frames in the buffer 380 indicates that the receiver clock 394 of the D/A 390 is too fast and needs to be slowed down.

The clock frequency correction may be performed each time a new $F_{pred}$ is received according to the formula:

$$C_{new} = C_{old} - v*(F_{pred} - F_{dec}), \quad (3)$$

where $C_{new}$ and $C_{old}$ are the clock frequency before and after the correction, and the value, v, is an integration factor greater than zero (v>0).

Thus, as shown in FIG. 3, the receiver 360 includes a radio receiver 365 that receives the composite bit stream from the RF link 358. A channel decoder 370 performs the inverse operations that were performed by the channel encoder 350. A bit stream parser 375 parses the decoded signal into packets, which are applied to the decoder buffer 380. In addition, the bit stream parser 375 obtains the transmitted predicted buffer level, $F_{pred}$, from the decoded signal, which is applied to an adder 382. The adder 382 compares the actual buffer level, $F_{dec}$, with the received predicted level, $F_{pred}$, and generates an error signal, BUFFER LEVEL ERROR, indicating the difference between the two values.

The error signal, BUFFER LEVEL ERROR, is applied to a controller 386. The controller 386 processes the error signal to determine when the PAC decoder 384 should begin decoding frames that have been placed in the decoder buffer 380 (when there are $F_{pred}$ frames in the decoder buffer 380 in the exemplary embodiment). In addition, the controller 386 processes the error signal to control the rate of the receiver clock 394 such that the clock 394 is synchronized with the transmitter 305. The decoded packets are then converted to an analog signal by a D/A converter 390 and the audio signal is reproduced by a speaker 398.

In one exemplary embodiment, a system is disclosed for controlling a buffer level in a communication system, comprising a memory that stores computer-readable code; and a processor operatively coupled to the memory and configured to implement the computer-readable code.

When the predicted decoder buffer level, $F_{pred}$ is transmitted from the DAB transmission system 305 to the receiver 360, its value should be represented by a reasonably small number of bits. To minimize the number of bits, the buffer level can be quantized and possibly encoded before it is transmitted.

It is to be understood that the embodiments and variations shown and described herein are merely illustrative of the principles of this invention and that various modifications may be implemented by those skilled in the art without departing from the scope and spirit of the invention.

We claim:

1. A system for adjusting a rate controller in a communication system, comprising:
   a memory that stores non-transitory computer-readable code; and
   a processor operatively coupled to said memory, said processor configured to execute said non-transitory computer-readable code, said non-transitory computer-readable code configured to direct the processor to:
   receive a predicted number of encoded frames in a buffer, wherein said predicted number of encoded frames considers a respective data rate of an encoder and a decoder and a channel bit rate of said communication system;
   compare said predicted number of encoded frames to an actual number of encoded frames in said buffer to generate a result; and
   apply a control signal from a rate controller in response to the result.

2. The system of claim 1, wherein said processor is further configured to adjust a clock frequency based on said result.

3. The system of claim 2, wherein said processor is further configured to increase said clock frequency if said predicted number of encoded frames is lower than said actual number of encoded frames in said buffer.

4. The system of claim 2, wherein said processor is further configured to decrease said clock frequency if said predicted number of encoded frames is higher than said actual number of encoded frames in said buffer.

5. The system of claim 1, wherein a controller is configured to determine when to commence a decoding of said frames using said predicted number of encoded frames.

6. The system of claim 5, wherein a controller waits approximately said predicted number of encoded frames before decoding said frames after a decoder is first started.

7. The system of claim 5, wherein a controller waits approximately said predicted number of encoded frames before decoding said frames after a new program is selected.

8. The system of claim 1, wherein said communication system is a digital audio broadcasting system.

9. The system of claim 1, wherein said predicted number of encoded frames is computed by the rate controller.

10. A system for adjusting an input to a buffer in a communication system, comprising:
a buffer for storing frames of encoded data; and
a rate controller that receives a predicted number of encoded frames in the buffer, wherein said predicted number of encoded frames considers a respective data rate of an encoder and a decoder and a channel bit rate of said communication system the rate controller arranged to compare said predicted number of encoded frames to an actual number of encoded frames in said buffer and adjust the bit rate upstream of the input to the buffer in response to a result.

11. The system of claim 10, wherein the rate controller adjusts a clock frequency based on said result.

12. The system of claim 11, wherein the clock frequency is increased when said predicted number of encoded frames is lower than said actual number of encoded frames in said buffer.

13. The system of claim 11, wherein the clock frequency is decreased when said predicted number of encoded frames is higher than said actual number of encoded frames in said buffer.

14. The system of claim 10, further comprising a controller configured to determine when to commence a decoding of said frames using said predicted number of encoded frames.

15. The system of claim 14, wherein said controller waits approximately said predicted number of encoded frames before decoding said frames after a decoder is first started.

16. The system of claim 14, wherein said controller waits approximately said predicted number of encoded frames before decoding said frames after a new program is selected.

17. The system of claim 10, wherein said communication system is a digital audio broadcasting system.

18. The system of claim 10, wherein said predicted number of encoded frames is computed by the rate controller.

* * * * *